M. RAPP.
STRAW SPREADER.
APPLICATION FILED NOV. 1, 1917.
1,313,735.
Patented Aug. 19, 1919.
3 SHEETS—SHEET 1.
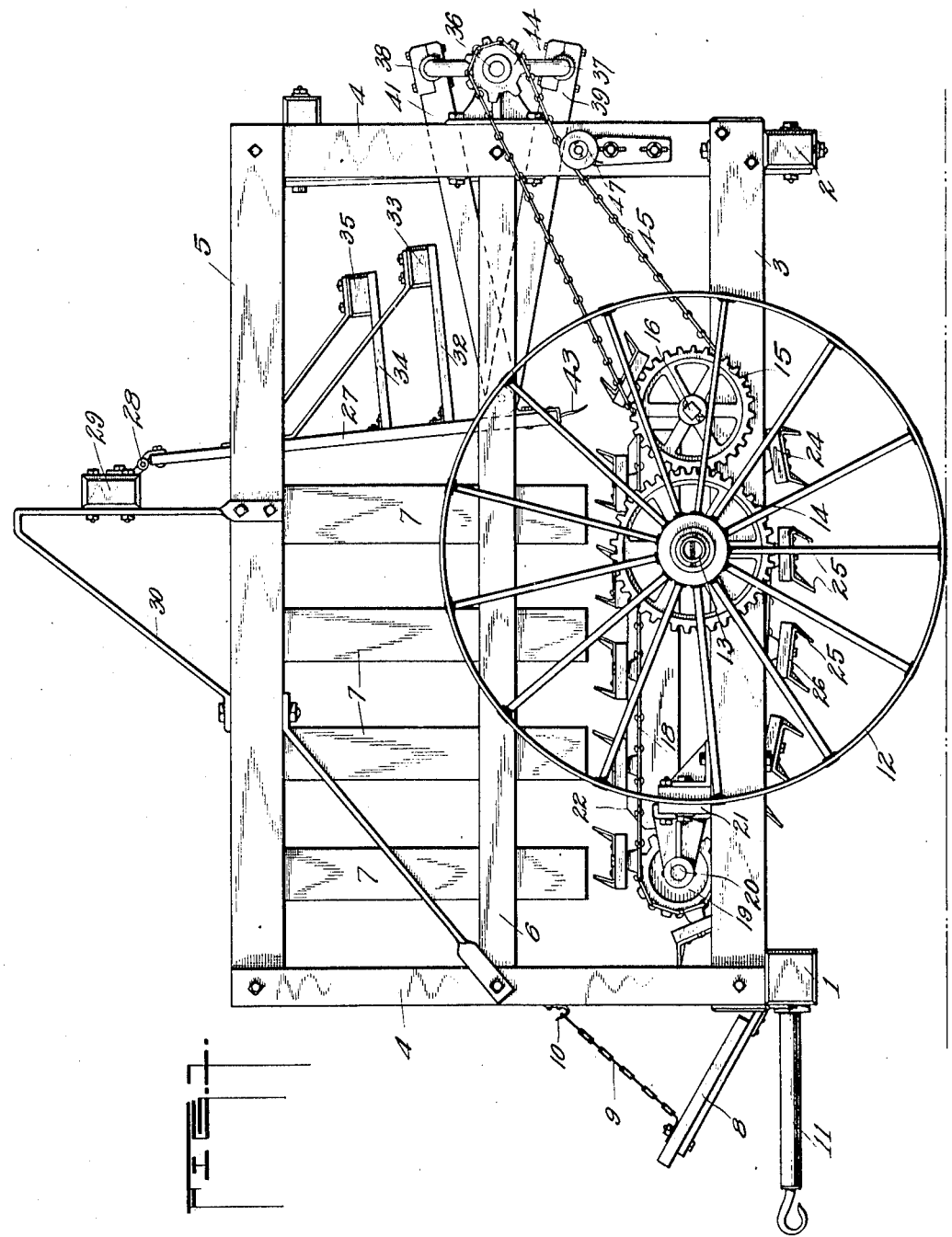

M. RAPP.
STRAW SPREADER.
APPLICATION FILED NOV. 1, 1917.
1,313,735.
Patented Aug. 19, 1919.
3 SHEETS—SHEET 2.
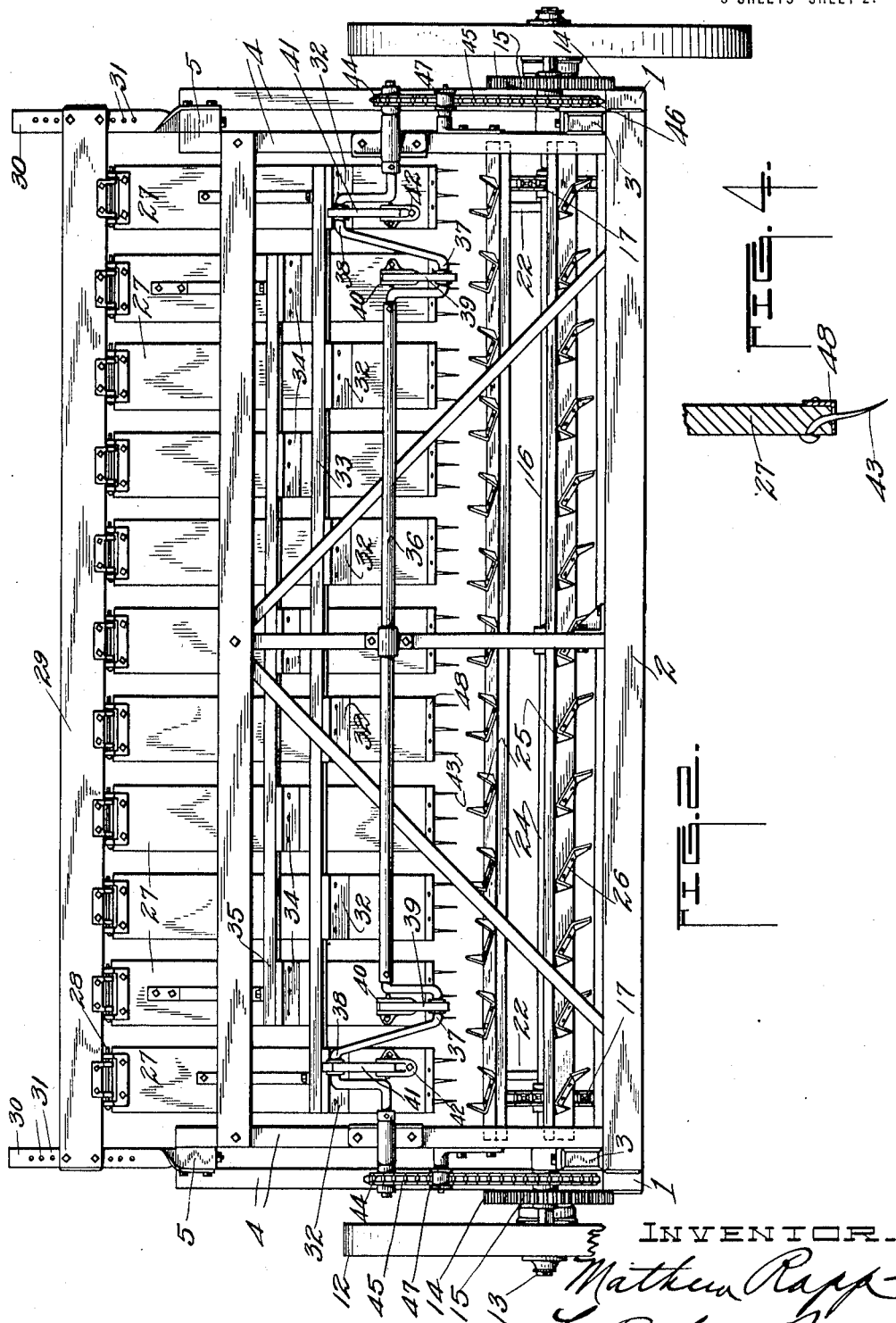

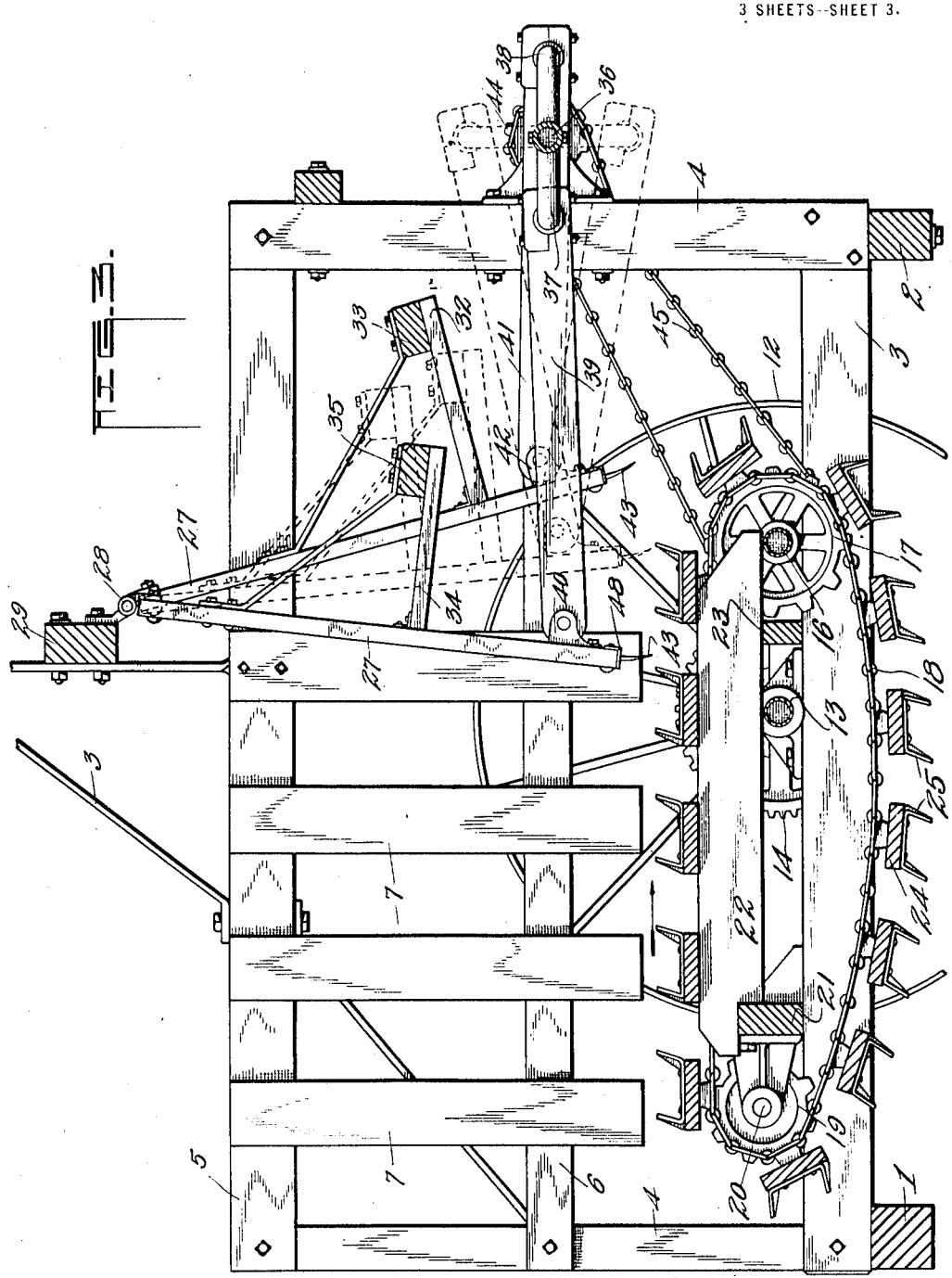

UNITED STATES PATENT OFFICE.

MATHEW RAPP, OF MORTON, ILLINOIS, ASSIGNOR TO KRAMER ROTARY HARROW COMPANY, OF MORTON, ILLINOIS, A CORPORATION OF ILLINOIS.

STRAW-SPREADER.

1,313,735.     Specification of Letters Patent.     Patented Aug. 19, 1919.

Application filed November 1, 1917. Serial No. 199,656.

*To all whom it may concern:*

Be it known that I, MATHEW RAPP, a citizen of the United States, a resident of Morton, in the county of Tazewell and State of Illinois, have invented new and useful Improvements in Straw-Spreaders, of which the following is a specification.

This invention has reference to straw spreaders, being of that type machine adapted to receive straw in the bulk, separate the same into a loose mass and distribute the same over a field to serve as a mulch.

One of the objects of the present invention is to provide a machine of the character referred to, which is adapted to be attached to and drawn over the field with a hay-rack, the hay being manually transferred from the rack into a hopper of the spreader and the straw torn apart that it may be distributed into a loose mulch over the field.

The invention has for a further object, a straw spreader including a hopper frame mounted upon wheels, and provided with an endless carrier to advance the straw to the rear or distributing end of the spreader, and to a series of oscillatory members, the alternate members of which preferably move in an opposite direction, and act as kickers for the purpose of separating the straw into a loose mass for even distribution over the field.

A further object of the invention is to provide an endless carrier which has means thereon that bite into the straw from beneath the latter so as to resist the action of the oscillatory members or other device, which latter combs the straw and acts to shred the same, thus obtaining simultaneous shredding of the straw from opposite sides, *i. e.* above and below during the movement thereof attendant upon its discharge.

The invention consists essentially of an endless carrier including a multiplicity of slats, each slat provided with a series of teeth in staggered arrangement, in combination with a series of oscillatory members, the alternate members of which preferably move in opposite directions, and each member provided with teeth adapted to coöperate with the teeth of the slats for the purpose of separating the straw into a loose mass as the straw is conveyed from the receiving to the distributing end of the spreader.

In the drawings,

Figure 1 is a side elevation of my improved straw spreader;

Fig. 2 is a rear view of the spreader;

Fig. 3 is an enlarged vertical cross section, showing the hopper of the spreader, the construction of the carrier and the relation of the oscillatory members with the carrier, the oscillatory members shown in full line and dotted line positions, and Fig. 4 is a detail of one of the oscillatory members.

Like characters of reference denote corresponding parts throughout the figures.

The frame of the spreader is greater in width than in length. The purpose of this is to make it sufficiently wide so that when it is attached to a hay-rack to be drawn over a field, the operator may throw the straw from the hay-rack into the spreader without the fear of pitching the same on the ground, and the length of the spreader is only sufficient to provide for the hopper to receive the material upon the carrier, and transfer it to the rear or distributing end of said spreader. This frame comprises the transverse front and rear sills 1 and 2, connected by the end longitudinal beams 3.

Connected to the beams 3 and extending up from the sills 1, are the standards 4 and said standards are connected at their upper ends by the longitudinal beams 5 and by the intermediate beams 6. Secured to the beams 5 and 6 and terminating just a short distance below the lower edges of the beams 6, are a series of spaced slats 7. These slats, together with the beams, form that portion of the frame into a hopper into which the straw is dumped, the operator pitching the same from the hay-rack into the hopper, by means of a pitch-fork, or some similar implement. The front end of the spreader is provided with the hinged apron gate or tail-board 8, held in different open positions by means of chains 9, one end of which is connected with the hinged gate or tail-board, and the opposite ends of said chains adapted to have connections with the hooks 10 attached to the standards 4.

It is obvious that the rear end of the hopper forming a portion of the frame, may be closed, or partially open, as shown in Fig. 1. Connected with the sill 1, is a coupling member 11, by means of which, a draft connection may be made between the straw spreader and the hay-rack for drawing the spreader over the field.

The straw spreader is mounted upon the ground wheels 12, journaled on a revolving axle 13, and on said axle at or near the opposite ends thereof, is secured a gear wheel 14, and meshing with each gear wheel 14 is a similar but smaller gear wheel 15. These gear wheels 15 are carried on a shaft 16, and said shaft 16 and said revolving axle 13, are journaled in suitable bearings or boxings mounted upon the beams 3. Also carried on the shaft 16 at or near their opposite ends, are sprocket wheels 17, with which connect an endless link belting 18, which also travels around sprocket wheels 19, carried on a shaft 20 journaled in suitable bearings or boxings secured to a beam 21, extending lengthwise of the spreader frame and mounted upon the beams 3. At or near the opposite ends of the beams 21 and secured thereto, are floor members 22, secured at their rear ends to the beam 23, which in turn, is supported upon the beams 3.

24 designates slats which are connected at their opposite ends in a suitable manner with the link belts 18, and during the operation of the sprocket wheels 17, are moved toward the rear end of the spreader with the upper run of the link belts and moved rearwardly of the spreader with the lower run of the link belts. As the slats move rearwardly, they rest upon the upper surface of the floor members 22, as best seen in Fig. 3. To the acting face of the slats 24, are attached a plurality of teeth 25 in staggered arrangement. For the purpose of strength, the teeth 25 are arranged in pairs and are connected with a plate 26 disposed diagonally of the slats 24, as best seen in Fig. 2. These teeth and plates, as shown in Fig. 2, are preferably bent into form from a single piece of sheet metal.

27 denotes a plurality of arms disposed approximately in a vertical position above and at or near the rear ends of the carrier. At their upper ends, the arms 27 are hinged as at 28 to a beam 29, which is connected at its opposite ends with the frames 30, and said frames are provided with the series of perforations 31, whereby the up and down position of the beam 29 and arms 27, may be adjusted. Starting with the outside arms 27, every other arm has a bracket 32 to which is connected a bar 33, through and by means of which said alternate arms may be moved in unison, forward and backward, as shall be explained; and, starting with the second arms 27 from the opposite ends of the machine, every other arm is provided with a bracket 34, to which is connected a bar 35, through and by means of which said alternate arms will be moved in unison, forward and backward, as shall be explained.

36 designates a shaft, journaled in suitable bearings, secured to the rear standards 4, and to any other or intermediate standards which may be provided, and the opposite ends of said shaft 36 are provided with the similar crank portions 37 and 38. To the crank portions 37 of the shaft 36, are connected the rear ends of pitman bars 39 which are pivotally connected at their forward ends to brackets 40 secured to the second arms 27, from each end, and to the crank portions 38 of the shaft 36 are connected the rear ends of pitman bars 41 which are pivotally connected at their forward ends to brackets 42 secured to the outside arms 27, at each end.

It is now obvious that when the shaft 36 is rotated, that the bars 30 connected with the crank portions 37 of said shaft, will move certain of the arms 27, first in one direction and then in an opposite direction, and that the arms 27 which are connected with the bars 41 through the bar 35, will move certain other arms 27 first in one direction and then in an opposite direction. The crank portions 37 and 38 of the shaft 36, are so disposed that when every other arm 27 is swung forwardly, the alternate arms 27 will be moved rearwardly; thus a number of the arms are moved forwardly and a number of the arms are moved rearwardly, simultaneously, in opposite directions.

To the lower end of each arm 27, are secured a series of teeth 43, which, together with the teeth 25 on the slats 24, tend to pull or tear the straw which is moved by the carrier for the purpose of separating the same into a loose mass to insure its proper discharge from the spreader and its distribution into a loose mulch over the field. The arms 27 are sufficiently close together so as to prevent the straw being discharged from the straw spreader in lumps, and to insure the proper separation of the straw into a loose mass.

The position of the lower ends of the teeth 43 of the arms 27 may be adjusted with respect to the teeth 25 of the slats 24, by adjusting the position of the bar 29 on the supports 30. This adjustment is not such as need be made very often, and is only provided so as to meet any contingency which may arise in the use of different kinds of straw which is to be spread over the field.

The shaft 36 is driven at both ends and on each end of said shaft is a sprocket wheel 44 engaged by a sprocket chain 45 actuated by a sprocket wheel 46 carried on each end of the shaft 16. These sprocket chains 45 travel over idlers 47 adjustably connected with the standards 4.

The teeth 43, connected with the lower ends of the arms 27 are preferably made in the form of pins, see Fig. 4, which are inserted from the rear into each arm, and down through the lower end thereof, passing through an angle iron bar 48 secured to the lower ends of the arms 27 and which protect the same against any wear.

By reference to Fig. 2, it will be seen that the opposite outer ends of the shaft 16, are squared and that on these squared ends, are carried the gear wheels 15. To disconnect the carrier from the traction wheels, and also to make inoperative the arms 27, the gear wheels 15 may be moved on the square ends of said shaft to cause a separation between said gear wheels 15 and 14, as will be understood.

The frame constituting the body of the straw spreader, may be braced in any suitable manner, and although certain braces are shown, there is no intention of limiting the bracing to the means shown.

The teeth 43 function to comb or shred the straw from above, while the teeth 25 of the endless carrier act to bite into the straw from below thereby to retard movement of the straw during the combing or shredding action of the teeth 43. The teeth 25 incidentally serve to shred the straw by virtue of the same biting into the straw and moving at the same time with the straw against the action of the teeth 43.

It is obvious that various changes may be made in the general construction and operation of the various parts, without departing from the spirit and scope of the invention, and I do not wish to be limited by the disclosure, except as provided in the appended claims.

What I claim is:

1. In a straw spreader, in combination, an endless carrier including a plurality of slats, teeth disposed in staggered arrangement on said slats, a plurality of suspended arms pivotally supported at their upper ends above said carrier, and means for moving the alternate arms, simultaneously, in opposite directions.

2. In a straw spreader, in combination, an endless carrier including a plurality of slats, teeth connected with said slats, a plurality of suspended arms pivotally supported at their upper ends above said carrier, teeth connected with the lower ends of said arms, a shaft having crank portions, connections between said arms and the crank portions of said shaft, whereby when the shaft is rotated, the alternate arms will move simultaneously in opposite directions, and means for operating said shaft.

3. In a straw spreader, in combination, a wheel mounted frame having a hopper portion, an endless carrier movable through the lower portion of said hopper, said carrier including a plurality of slats, teeth projecting from said slats, arms suspended above and near the rear end of said carrier, said arms being pivotally connected to the frame at their upper ends, teeth connected with the swinging ends of said arms, and means for moving the alternate arms, simultaneously, in opposite directions.

4. In a straw spreader, in combination, a frame having a hopper portion, traction wheels supporting said frame, an endless carrier, means for actuating said carrier from said traction wheels, a plurality of suspended arms pivotally supported at their upper ends, the lower ends of said arms operating above the rear end of said carrier, teeth connected with the swinging ends of said arms, a shaft having crank portions, connections between the crank portions of said shaft and certain of said arms, means connecting certain of said arms, in series, whereby when said crank shaft is rotated, alternate arms will swing simultaneously in opposite directions, and means for operating said crank shaft.

5. In a straw spreader, in combination, a wheel mounted frame having a hopper portion, an endless carrier movable through the lower portion of said hopper, said carrier including a plurality of slats, teeth projecting from said slats to assist in separating the straw, a plurality of swinging members operating above the carrier and having teeth which coöperate with the teeth on the carrier to separate the straw into a loose mass, and means for moving the alternate members simultaneously, in opposite directions.

6. In a straw spreader, in combination, a wheel mounted frame having a hopper portion, an endless carrier movable through the lower portion of said hopper, said carrier including a plurality of slats, teeth projecting from said slats, arms suspended above and near the rear end of said carrier, a support to which said arms are pivotally connected, said support having an up and down adjustable connection with the frame, teeth connected with the swinging ends of said arms, and means for moving alternate arms simultaneously, in opposite directions.

7. In a straw spreader, in combination, an endless carrier including a plurality of slats, teeth disposed in staggered arrangement on said slats, a plurality of arms pivotally supported at their upper ends above said carrier, and means for moving certain arms, simultaneously, in opposite directions.

8. In a straw spreader, in combination, an endless carrier including a plurality of slats, teeth disposed in staggered arrangement on said slats, a plurality of sets of arms pivotally supported at their upper ends, above said carrier, and means for simultaneously moving one set of arms in one direction while the other set is moved in the opposite direction.

9. In a straw spreader, the combination of a main frame, two supporting ground wheels, a receiving hopper, an endless carrier including a plurality of slats, means for operating said carrier from said wheels, a cross-beam above the hopper, a plurality of suspended arms within the hopper and above said carrier, means for pivotally supporting the arms from said beam, and means for oscillating said arms.

10. In a straw spreader, the combination of a main frame, two supporting ground wheels, a receiving hopper, an endless carrier including a plurality of slats, means for operating said carrier from said wheels, upstanding frames on opposite sides of said hopper, a cross-beam adapted to have an adjustable connection with said frames, a plurality of suspended arms within the hopper and above said carrier, means for pivotally supporting the arms from said beam, and means for oscillating said arms.

11. In a straw spreader, the combination of a main frame, two supporting ground wheels, a receiving hopper, a plurality of tracks within the hopper, an endless carrier including a plurality of slats movable on said tracks, gearing connecting said carrier with the ground wheels, a cross-beam above the hopper, a plurality of suspended arms within the hopper and above said carrier, means for pivotally supporting the arms from said beam, and connections between said gearing and said suspended arms for oscillating the latter.

12. In a straw-spreader, the combination of a main frame, two supporting ground wheels, a receiving hopper, said hopper having slatted side walls, an endless carrier forming a bottom for the hopper, means for operating said carrier from said ground wheels, a plurality of arms suspended above the carrier to regulate and equalize the discharge of material from the hopper, means for pivotally supporting said arms at their upper ends, prongs on the lower ends of said arms, and means for oscillating said arms.

13. In a straw spreader, a container, an endless carrier therein, combing means located above the carrier, a series of means borne by the carrier to engage the straw from beneath the latter so as to bite into the straw and thereby resist the action of the combing means, and means to actuate the combing means and the carrier.

14. In a straw spreader, a wheeled supporting frame having a hopper thereon, means to connect said frame to the rear of a wagon or the like so as to have a trailer relation thereto, an endless carrier having series of spaced means to engage beneath and bite into the straw, said carrier having a flight forming the bottom of the hopper, combing means above the carrier having teeth coöperating with the straw engaging means of the carrier, and means to operate the carrier and combing means.

15. In a straw spreader, a wheeled supporting frame having a hopper thereon, means to connect said frame to the rear of a wagon or the like so as to have a trailer relation thereto, an endless carrier having series of spaced means to engage beneath and bite into the straw, said carrier having a flight forming the bottom of the hopper, combing means above the carrier having teeth coöperating with the straw engaging means of the carrier, and means to operate the carrier and combing means from the wheels of the supporting frame.

16. In a straw spreader, a wheeled supporting frame having a hopper thereon, means to connect said frame to the rear of a wagon or the like so as to have a trailer relation thereto, an endless carrier having series of spaced means to engage beneath and bite into the straw, said carrier having a flight forming the bottom of the hopper, combing means above the carrier having teeth coöperating with the straw engaging means of the carrier, and means whereby to effect variance of the space between the teeth of the combing means and the carrier so as to obtain discharge of the straw in varying thicknesses thereof.

17. In a straw spreader, in combination, a wheeled hopper having means to attach it to a vehicle containing the fibrous material and to trail therebehind; feeding means in the hopper comprising a endless carrier having a multiplicity of teeth to grasp the material, and a plurality of oscillatory combing and repelling members acting at the discharge end of the carrier to comb and tear the material in a loose mass.

18. In a straw spreader, in combination, a wheeled hopper having means to attach it to a vehicle containing the fibrous material and to trail therebehind; feeding means in the hopper comprising an endless carrier having a multiplicity of teeth to grasp the material; a plurality of oscillatory combing and repelling members acting at the discharge end of the carrier to comb and tear the material in a loose mass, and means to effect relative adjustment of said repelling members and said carrier teeth to regulate the thickness of the layer of material spread.

19. In a straw spreader, in combination, a wheeled trailer having means to attach it to a vehicle containing the fibrous material; slatted boards forming the closures at opposite ends of the trailer; an apron forming the closure at the front of the trailer; a forked gate forming the closure at the rear of the trailer, said forks mounted so as to be oscillated and adapted to comb and tear the material in a loose mass, and an endless carrier forming the bottom of the trailer and having teeth to grasp the material.

20. In a straw spreader, in combination, a wheeled trailer having means to attach it to a vehicle containing the fibrous material; slatted boards forming the closures at opposite ends of the trailer; an apron forming the closure at the front of the trailer; a forked gate forming the closure at the rear of the trailer, said forks mounted so as to be oscillated and adapted to comb and tear the material in a loose mass; an endless carrier forming the bottom of the trailer and having teeth to grasp the material, and means to effect adjustment of the effective ends of the forks relative to the carrier teeth to regulate the thickness of the layer of material spread.

21. In a straw spreader, in combination, a wheeled trailer having means to attach it to a vehicle containing the fibrous material; slatted boards forming the closures at opposite ends of the trailer; an apron forming the closure at the front of the trailer, and hinged so as to be opened or closed; a forked gate forming the closure at the rear of the trailer, said forks mounted so as to be oscillated and adapted to comb and tear the material in a loose mass; an endless carrier forming the bottom of the trailer and having teeth to grasp the material, and means to adjust the forks relative to the carrier teeth to regulate the amount of material spread.

22. In a straw spreader, in combination, a wheeled hopper having means to attach it to a vehicle containing the fibrous material and to trail therebehind; feeding means in the hopper comprising an endless carrier having a multiplicity of teeth to grasp the material; a plurality of combing and repelling members at the discharge end of the carrier to comb and tear the material in a loose mass; a crank-shaft; means connecting said combing and repelling members with said shaft, and means for actuating said shaft.

23. In a straw spreader, in combination, a wheeled hopper having means to attach it to a vehicle containing the fibrous material and to trail therebehind; feeding means in the hopper comprising an endless carrier having a multiplicity of teeth to grasp the material; a plurality of combing and repelling members at the discharge end of the carrier to comb and tear the material in a loose mass, means to adjust said repelling members relative to said carrier teeth to regulate the amount of material spread; a crank-shaft; means connecting said combing and repelling members with said shaft, and means for actuating said shaft.

24. In a straw spreader, in combination, a wheeled hopper having means to attach it to a vehicle containing the fibrous material and to trail therebehind; feeding means in the hopper comprising an endless carrier having a multiplicity of teeth to grasp the material; a plurality of combing and repelling members at the discharge end of the carrier to comb and tear the material in a loose mass; a hanger for said members; means for hingedly connecting said members to said hanger; a crank-shaft, and means connected with said crank-shaft for swinging said members.

25. In a straw spreader, in combination, a wheeled hopper having means to attach it to a vehicle containing the fibrous material and to trail therebehind; feeding means in the hopper comprising an endless carrier having a multiplicity of teeth to grasp the material; a plurality of combing and repelling members at the discharge end of the carrier to comb and tear the material in a loose mass; a hanger for said members; means for hingedly connecting said members to said hanger; means for adjusting the hanger and with it the members, whereby there may be more or less material spread; a crank-shaft, and means connected with said crank-shaft for swinging said members.

26. In a straw spreader, in combination, a wheeled hopper having means to attach it to a vehicle containing the fibrous material and to trail therebehind; a movable bottom for the hopper comprising an endless carrier having a multiplicity of teeth to grasp the material; a plurality of oscillatory combing and repelling members acting at the discharge end of the carrier to comb and tear the material in a loose mass; driving means between the wheels and carrier, and between the wheels and combing and repelling members, and means whereby said driving means effects movement of the members relatively faster than the movement of the carrier.

In witness whereof I have hereunto affixed my hand this 24th day of October, 1917.

MATHEW RAPP.